(No Model.)
H. H. HARNDEN.
DRAFT EVENER.
No. 505,160. Patented Sept. 19, 1893.
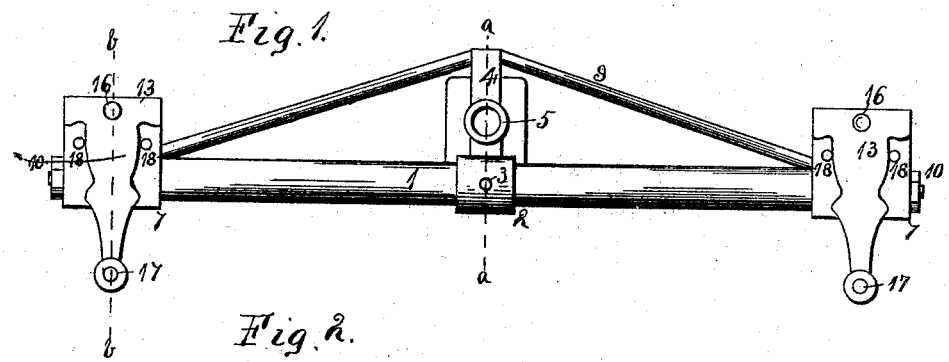
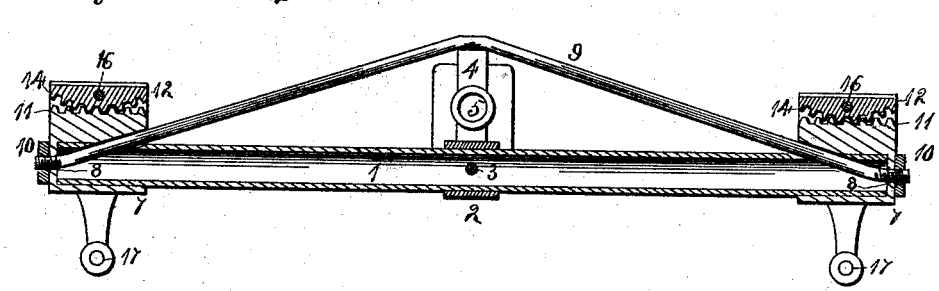
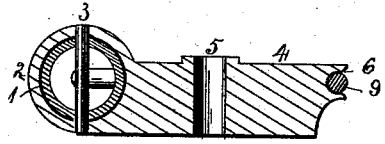
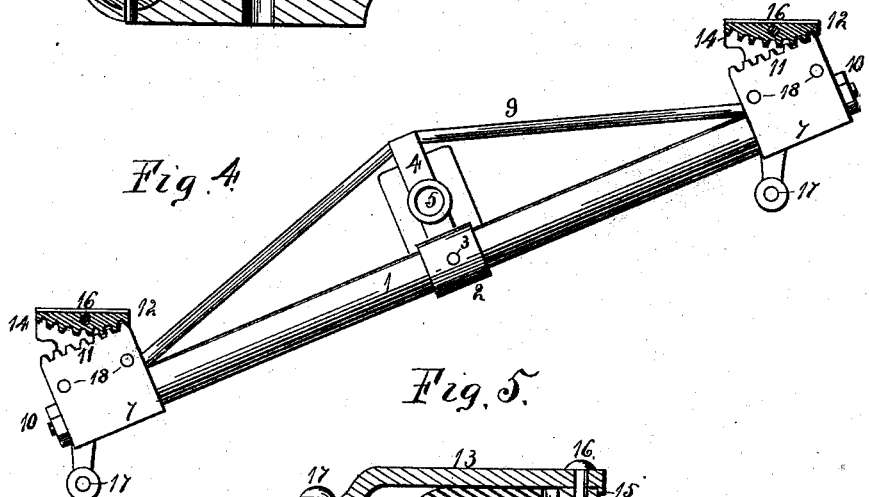
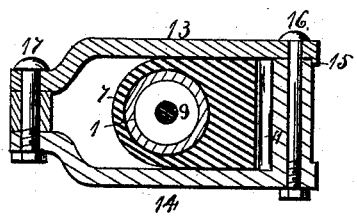
Witnesses:
E. Behel.
S. A. Davenport.
Inventor:
Henry H. Harnden
By A. O. Behel
Atty.

UNITED STATES PATENT OFFICE.

HENRY H. HARNDEN, OF ROCKFORD, ILLINOIS.

DRAFT-EVENER.

SPECIFICATION forming part of Letters Patent No. 505,160, dated September 19, 1893.

Application filed April 26, 1893. Serial No. 471,876. (No model.)

*To all whom it may concern:*

Be it known that I, HENRY H. HARNDEN, a citizen of the United States, residing at Rockford, in the county of Winnebago and State of Illinois, have invented certain new and useful Improvements in Eveners, of which the following is a specification.

The object of this invention is to construct an evener of tubing having a truss rod connecting its ends and passing over a central support.

The further object of this invention is to provide a toothed rack and segment connection of the singletree with the evener.

In the accompanying drawings,—Figure 1, is a plan view of my improvements. Fig. 2, is a horizontal central section. Fig. 3, is a transverse section on dotted line $a$, Fig. 1. Fig. 4, is a horizontal section through the connections of the singletree with the evener, showing the evener at an angle to the line of draft. Fig. 5, is a transverse section on dotted line $b$, Fig. 1.

My improved evener consists of the tube 1, of sufficient diameter having a central hole, and lengthwise slots near its ends. A collar 2, is placed upon the tube midway of its length and a pin 3, holds it in position by passing through the hole in the tube. From this collar extends an arm 4, provided with a vertical hole 5, and its end provided with a horizontal groove 6. Over the ends of the tubing are placed caps 7, having a hole 8, in the end thereof. A truss rod 9, is placed in the groove 6, its ends passing through the slots in the tube, near its ends, and through the holes in the ends of the caps, and nuts 10, are placed upon its screw threaded ends by means of which the strain brought to bear upon the ends of the evener will be borne by the truss rod. The rear side of the caps are provided with vertical teeth 11, and upon its top and bottom faces are located the two halves 12 and 13, of the clevis. The lower half is provided with vertical teeth 14, in the form of a convex segment, meshing with the teeth of the caps. The upper half is provided with a depending lip 15, embracing the rear face of the segment and a bolt 16, holds the halves together. The front end of the halves of the clevis being connected by a bolt 17, to which the singletree is connected. Pins 18, extending from the top and bottom faces of the ends form guides for the clevis one on each side of the top and bottom plates, which prevents lateral displacement of the clevis.

I claim as my invention—

1. In an evener, a connection between the singletrees and evener consisting of a stationary portion secured to the evener, having its rear face provided with teeth, a clevis consisting of a top and bottom plate, the rear ends connected by a toothed segment, which meshes with the teeth of the stationary portion, and pins extending from the stationary portion located on either edge of the top and bottom plates holding them in proper position.

2. In an evener, consisting of a tubular support having a brace rod connected with its ends and with a central support and a connection between the singletrees and evener consisting of a stationary portion secured to the evener, having its rear face provided with teeth, a clevis consisting of a top and bottom plate, the rear ends connected by a toothed segment, which meshes with the teeth of the stationary portion, and pins extending from the stationary portion located on either edge of the top and bottom plates holding them in proper position.

HENRY H. HARNDEN.

Witnesses:
A. O. BEHEL,
E. BEHEL.